United States Patent
Li

(10) Patent No.: US 11,864,111 B2
(45) Date of Patent: Jan. 2, 2024

(54) DOWNLINK CHANNEL MONITORING METHOD, TERMINAL, AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 300 days.

(21) Appl. No.: 17/311,286

(22) PCT Filed: Dec. 5, 2018

(86) PCT No.: PCT/CN2018/119425
§ 371 (c)(1),
(2) Date: Jun. 4, 2021

(87) PCT Pub. No.: WO2020/113481
PCT Pub. Date: Jun. 11, 2020

(65) Prior Publication Data
US 2022/0022133 A1    Jan. 20, 2022

(51) Int. Cl.
*H04W 52/02* (2009.01)
(52) U.S. Cl.
CPC ... *H04W 52/0229* (2013.01); *H04W 52/0235* (2013.01); *H04W 52/0258* (2013.01)
(58) Field of Classification Search
CPC ......... H04W 52/0229; H04W 52/0235; H04W 52/0258; H04W 74/00; H04W 74/08; Y02D 30/70
See application file for complete search history.

(56) References Cited

U.S. PATENT DOCUMENTS

2008/0109669 A1    5/2008  Kim
2020/0154355 A1*   5/2020  Nam ................. H04W 52/0216
(Continued)

FOREIGN PATENT DOCUMENTS

CN    101155355 A    4/2008
CN    101860983 A    10/2010
CN    104125077 A    10/2014

OTHER PUBLICATIONS

3GPP TSG RAN WG1 Meeting #89; R1-1708311; Source: Sierra Wireless; Title: Idle Mode Power Efficiency Reduction, Hangzhou, P.R. China May 15-19, 2017 (Year: 2017).*

(Continued)

*Primary Examiner* — Mohammed S Chowdhury
(74) *Attorney, Agent, or Firm* — Arch & Lake LLP

(57) ABSTRACT

A downlink channel monitoring method includes monitoring a downlink channel with a first monitoring mode, where the first monitoring mode comprises a full monitoring mode, a wake-up signal monitoring mode, or a sleep signal monitoring mode. Additionally, the method includes monitoring levels of the full monitoring mode, the wake-up signal monitoring mode, and the sleep signal monitoring mode, where the full monitoring mode, the wake-up signal monitoring mode, and the sleep signal monitoring mode are different. Further, the method includes switching, in response to determining that a monitoring situation satisfies a preset condition, a monitoring mode from the first monitoring mode to a second monitoring mode matching the preset condition according to the monitoring levels. Finally, the method includes monitoring the downlink channel with the second monitoring mode, where the second monitoring mode is different from the first monitoring mode.

17 Claims, 4 Drawing Sheets

(56) References Cited

U.S. PATENT DOCUMENTS

| | | | | |
|---|---|---|---|---|
| 2020/0359323 | A1* | 11/2020 | Beale | H04W 52/0229 |
| 2021/0014791 | A1* | 1/2021 | Freda | H04W 52/0232 |
| 2021/0314864 | A1* | 10/2021 | Xue | H04W 76/28 |
| 2021/0314866 | A1* | 10/2021 | Lee | H04W 52/0229 |
| 2021/0321446 | A1* | 10/2021 | Lee | H04L 5/0094 |
| 2021/0352581 | A1* | 11/2021 | Wong | H04J 13/0062 |

OTHER PUBLICATIONS

3GPP TSG-RAN WG1 Meeting NR#3; R1-1716553; Source: Apple Inc.; Title: Control Information for UE Power Saving; Nagoya, Japan, Sep. 18-21, 2017 (Year: 2017).*

3GPP TSG-RAN WG2 Meeting #102; R2-1807744; Source: MediaTek Inc.; Title: WUS time configuration, Busan, Korea, May 21-25, 2018. (Year: 2018).*

3GPP TSG-RAN WG2#103; Tdoc R2-1811627; Source: Ericsson; Title: DRX with short on-Duration and Wake-up signaling; Gothenburg, Sweden, Aug. 20-24, 2018. (Year: 2018).*

International Search Report issued in PCT/CN2018/119425, dated Aug. 27, 2019 with English translation, (4p).

* cited by examiner

DOWNLINK CHANNEL MONITORING METHOD, TERMINAL, AND STORAGE MEDIUM

CROSS-REFERENCE TO RELATED APPLICATION

This application is the U.S. national phase application of PCT Application No. PCT/CN2018/119425, filed Dec. 5, 2018, the entire contents of which are incorporated herein by reference for all purposes.

TECHNICAL FIELD

The present disclosure relates to the technical field of communications, and more particularly, to a downlink channel monitoring method, a terminal, and a storage medium.

BACKGROUND

In a communication system, a base station generally sends instructions to a terminal through a downlink channel, and the terminal monitors the downlink channel to receive the instructions transmitted by the downlink channel. Different monitoring methods have different characteristics, can achieve different monitoring effects, and consume different resources of the terminal. Currently, the following three monitoring modes are provided according to the different monitoring methods.

A first monitoring mode is a full monitoring mode. In the full monitoring mode, a monitoring period and a non-monitoring period are set. The terminal monitors the downlink channel during the monitoring period, and enters a sleep state and stops monitoring the downlink channel during the non-monitoring period.

A second monitoring mode is a wake-up signal monitoring mode. In the wake-up signal monitoring mode, the monitoring period and non-monitoring period are set. The terminal monitors a wake-up signal transmitted on the downlink channel. It is determined that the downlink channel is monitored during the next monitoring period when the wake-up signal is monitored, and the downlink channel is not monitored during the next monitoring period when the wake-up signal is not monitored by the terminal. In addition, the terminal enters the sleep state and stops monitoring the downlink channel during the non-monitoring period.

A third monitoring mode is a sleep signal monitoring mode. In the sleep signal monitoring mode, the monitoring period and the non-monitoring period, as well as a preset duration of the sleep state, are set. The terminal monitors a sleep signal transmitted on the downlink channel. The terminal enters the sleep state and stops monitoring the downlink channel when the sleep signal is monitored, and stops sleeping when the duration of the sleep state reaches the preset duration. In addition, the terminal enters the sleep state and stops monitoring the downlink channel during the non-monitoring period.

The above three monitoring modes operate independently and cannot be switched one another. Therefore, there is an urgent need to provide a method for switching monitoring modes between each other.

SUMMARY

The present disclosure provides a downlink channel monitoring method, a terminal, and a storage medium, which can solve the problems of the related art. The technical solutions are as follows.

According to a first aspect of the present disclosure, there is provided a downlink channel monitoring method, which is applied to a terminal. The method includes:

monitoring a downlink channel with a first monitoring mode, where the first monitoring mode is a full monitoring mode, a wake-up signal monitoring mode, or a sleep signal monitoring mode, and the monitoring levels of the full monitoring mode, the wake-up signal monitoring mode, and the sleep signal monitoring mode are different;

in response to determining that a monitoring situation satisfies a preset condition, switching, according to the monitoring level of each monitoring mode, the first monitoring mode to a second monitoring mode that matches the preset condition; and monitoring the downlink channel with the second monitoring mode, where the second monitoring mode is different from the first monitoring mode.

According to a second aspect of the present disclosure, there is provided a terminal including a processor and a memory for storing instructions executable by the processor. The processor is configured to: monitor a downlink channel with a first monitoring mode, where the first monitoring mode comprises a full monitoring mode, a wake-up signal monitoring mode, or a sleep signal monitoring mode, and the monitoring levels of the full monitoring mode, the wake-up signal monitoring mode, and the sleep signal monitoring mode are different.

Further, the processor is configured to switch the first monitoring mode to a second monitoring mode that matches the preset condition according to the monitoring level of each monitoring mode in response to determining that a monitoring situation satisfies a preset condition. Moreover, the processor is configured to monitor the downlink channel with the second monitoring mode, where the second monitoring mode is different from the first monitoring mode.

According to a third aspect of the present disclosure, there is provided a computer-readable storage medium. At least one instruction is stored in the computer-readable storage medium, and the at least one instruction is executed by a processor to implement operations including monitoring a downlink channel with a first monitoring mode, where the first monitoring mode including a full monitoring mode, a wake-up signal monitoring mode, or a sleep signal monitoring mode, and monitoring levels of the full monitoring mode, the wake-up signal monitoring mode, and the sleep signal monitoring mode are different. Additionally, the operations may include switching a monitoring mode from the first monitoring mode to a second monitoring mode matching the preset condition according to the monitoring levels in response to determining that a monitoring situation satisfies a preset condition. Further, the operations may include monitoring the downlink channel with the second monitoring mode, where the second monitoring mode is different from the first monitoring mode.

BRIEF DESCRIPTION OF THE DRAWINGS

The accompanying drawings herein, which are incorporated in and constitute a part of this specification, illustrate embodiments consistent with the disclosure and, together with the description, serve to explain the principles of the disclosure.

DETAILED DESCRIPTION

In order to make the objectives, technical solutions, and advantages of the present disclosure clearer, the present disclosure will be described in detail below with reference to the embodiments and the drawings. Herein, the embodiments and descriptions of the present disclosure are used to explain the present disclosure, but are not intended to limit the present disclosure.

Embodiments of the present disclosure provide a downlink channel monitoring method, a terminal, and a storage medium. The present disclosure will be described in detail below with reference to the accompanying drawings.

Figure 1:
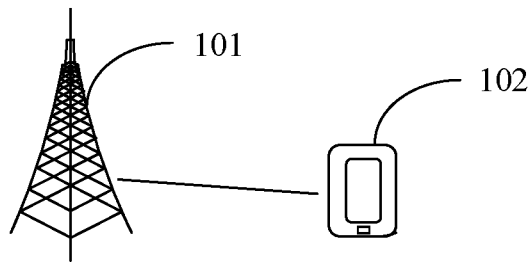
FIG. 1 is a schematic structural diagram showing a communication system according to an embodiment.

FIG. 1 is a schematic structural diagram showing a communication system according to an embodiment. As shown in FIG. 1, the communication system includes a base station 101 and a terminal 102, and the base station 101 and the terminal 102 are connected through a communication network.

In a communication process, a downlink channel and an uplink channel are configured between the base station 101 and the terminal 102. The base station 101 may send signals or instructions to the terminal 102 through the downlink channel, and the terminal 102 may send signals or instructions to the base station 101 through the uplink channel, so as to realize the interaction between the base station 101 and the terminal 102.

In order to monitor the target instructions sent by the base station 101 in time, the terminal 102 may monitor the downlink channel and monitor the target instructions sent through the downlink channel. Wherein, the target instructions may be a Physical Downlink Control Channel (PDCCH) authorization instruction, a scheduling instruction or a control instruction, or may also be other instructions.

In addition, in order to save power, the terminal 102 may not monitor the downlink channel in real time, but monitor according to a transmission situation of the downlink channel. For details of the monitoring method, please refer to the following method embodiments.

Figure 2:
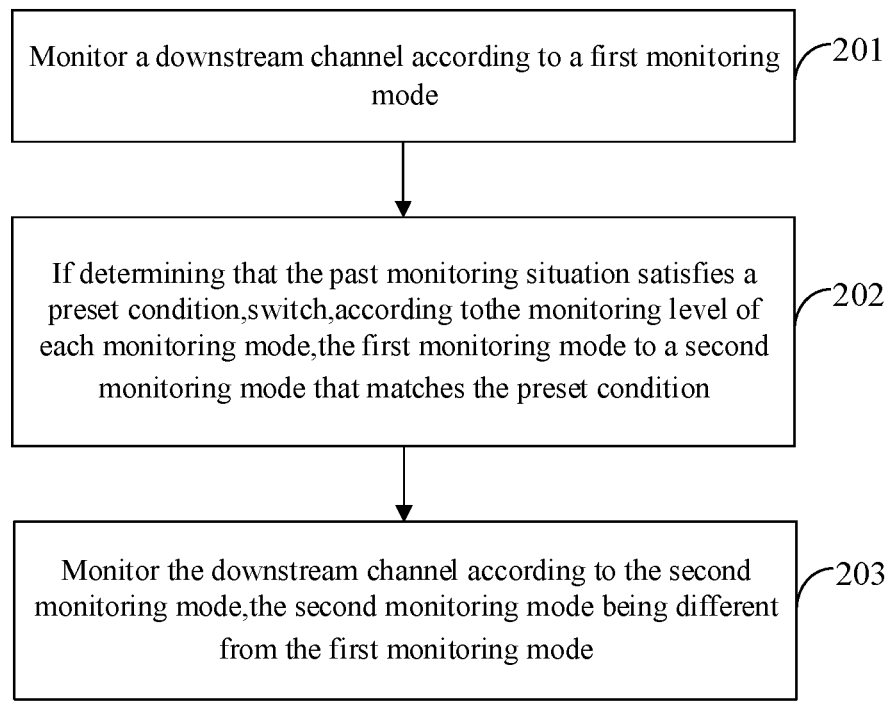
FIG. 2 is a flowchart showing a downlink channel monitoring method according to an embodiment.

FIG. 2 is a flowchart showing a downlink channel monitoring method according to an embodiment, which is applied to a terminal. As shown in FIG. 2, the method includes the following steps.

In step 201, monitoring a downlink channel with a first monitoring mode.

Wherein the terminal is set with the following monitoring modes: a full monitoring mode, a wake-up signal monitoring mode, or a sleep signal monitoring mode. The monitoring levels of the full monitoring mode, the wake-up signal monitoring mode, or the sleep signal monitoring mode are different. The first monitoring mode may be any one of the above monitoring modes.

In step 202, in response to determining that a past monitoring situation satisfies a preset condition, switching, according to the monitoring level of each monitoring mode, the first monitoring mode to a second monitoring mode that matches the preset condition.

In step 203, monitoring the downlink channel with the second monitoring mode, the second monitoring mode being different from the first monitoring mode.

In the method provided by the embodiments of the present disclosure, the terminal is provided with a plurality of monitoring modes with different monitoring levels. In the process of monitoring the downlink channel with the first monitoring mode, when it is determined that the past monitoring situation satisfies the preset condition, the first monitoring mode is switched, according to the monitoring level of each monitoring mode, to the second monitoring mode that matches the preset condition, and the downlink channel is monitored with the second monitoring mode which is different from the first monitoring mode, thereby dynamically adjusting the monitoring mode according to the past monitoring situation, implementing flexible switching between different monitoring modes, instead of only using a fixed monitoring mode for monitoring, and improving the degree of intelligence.

In one possible implementation, the monitoring level of the full monitoring mode is higher than the monitoring level of the wake-up signal monitoring mode, and the monitoring level of the wake-up signal monitoring mode is higher than the monitoring level of the sleep signal monitoring mode; and the in response to determining that the past monitoring situation satisfies the preset condition, switching, according to the monitoring level of each monitoring mode, the first monitoring mode to the second monitoring mode that matches the preset condition includes:

in response to determining that the past monitoring situation satisfies a first preset condition for increasing the monitoring level, determining the monitoring mode with the monitoring level higher than the first monitoring mode as the second monitoring mode, and switching the first monitoring mode to the second monitoring mode; or in response to determining that the past monitoring situation satisfies a second preset condition for decreasing the monitoring level, determining the monitoring mode with the monitoring level lower than the first monitoring mode as the second monitoring mode, and switching the first monitoring mode to the second monitoring mode.

In one possible implementation, the first monitoring mode is the full monitoring mode, and the in response to determining that the past monitoring situation satisfies the preset condition, switching, according to the monitoring level of each monitoring mode, the first monitoring mode to the second monitoring mode that matches the preset condition includes:

in response to determining that a target instruction is not monitored for a first preset number of monitoring periods before the current moment, determining the wake-up signal monitoring mode or the sleep signal monitoring mode as the second monitoring mode, and switching the full monitoring mode to the second monitoring mode; or in response to determining that the target instruction is not monitored within a first preset duration before the current moment, determining the wake-up signal monitoring mode or the sleep signal monitoring mode as the second monitoring mode, and switching the full monitoring mode to the second monitoring mode.

In one possible implementation, the first monitoring mode is the wake-up signal monitoring mode, and the in response to determining that the past monitoring situation satisfies the preset condition, switching, according to the monitoring level of each monitoring mode, the first monitoring mode to the second monitoring mode that matches the preset condition includes at least one of:

in response to determining that a wake-up signal is monitored for a second preset number of monitoring periods before the current moment, determining the full monitoring mode as the second monitoring mode, and switching the wake-up signal monitoring mode to the full monitoring mode; and in response to determining that a third preset number of the wake-up signal is monitored within a second preset duration before the current moment, determining the full monitoring mode as the second monitoring mode, and switching the wake-up signal monitoring mode to the full monitoring mode.

In one possible implementation, the first monitoring mode is the wake-up signal monitoring mode, and the in response to determining that the past monitoring situation satisfies the preset condition, switching, according to the monitoring level of each monitoring mode, the first monitoring mode to the second monitoring mode that matches the preset condition includes at least one of:

in response to determining that a wake-up signal is not monitored for a fourth preset number of monitoring periods before the current moment, determining the sleep signal monitoring mode as the second monitoring mode, and switching the wake-up signal monitoring mode to the sleep signal monitoring mode;

in response to determining that the wake-up signal is not monitored within a third preset duration before the current moment, determining the sleep signal monitoring mode as the second monitoring mode, and switching the wake-up signal monitoring mode to the sleep signal monitoring mode; and in response to determining that a fifth preset number of the wake-up signal is not monitored within a fourth preset duration before the current moment, determining the sleep signal monitoring mode as the second monitoring mode, and switching the wake-up signal monitoring mode to the sleep signal monitoring mode.

In one possible implementation, the first monitoring mode is the sleep signal monitoring mode, and the in response to determining that the past monitoring situation satisfies the preset condition, switching, according to the monitoring level of each monitoring mode, the first monitoring mode to the second monitoring mode that matches the preset condition includes:

in response to determining that a duration of a sleep state in the sleep signal monitoring mode reaches a fifth preset duration, determining the full monitoring mode or the wake-up signal monitoring mode as the second monitoring mode, and switching the sleep signal monitoring mode to the second monitoring mode.

In one possible implementation, the first monitoring mode is the sleep signal monitoring mode, and the in response to determining that the past monitoring situation satisfies the preset condition, switching, according to the monitoring level of each monitoring mode, the first monitoring mode to the second monitoring mode that matches the preset condition includes:

in response to determining that a duration of a sleep state in the sleep signal monitoring mode reaches a sixth preset duration, determining the wake-up signal monitoring mode as the second monitoring mode, and switching the sleep signal monitoring mode to the wake-up signal monitoring mode; and the method further includes: in response to determining that a target instruction is not monitored within a seventh preset duration before the current moment, switching the wake-up signal monitoring mode to the sleep signal monitoring mode, monitoring the downlink channel with the sleep signal monitoring mode, and increasing the sixth preset duration.

In one possible implementation, the downlink channel is a first downlink channel, and the method further includes:

in the process of monitoring the first downlink channel with the first monitoring mode, monitoring a second downlink channel with a third monitoring mode; the monitoring level of the third monitoring mode being not higher than that of the first monitoring mode;

in response to determining that the monitoring mode of the first downlink channel is switched to the second monitoring mode, switching, according to the monitoring level of each monitoring mode, the monitoring mode of the second downlink channel to a fourth monitoring mode, such that a monitoring level change trend of the second downlink channel matches the monitoring level change trend of the first downlink channel; and in the process of monitoring the first downlink channel with the second monitoring mode, monitoring the second downlink channel with the fourth monitoring mode.

In one possible implementation, the monitoring level of the full monitoring mode is higher than the monitoring level of the wake-up signal monitoring mode, and the monitoring level of the wake-up signal monitoring mode is higher than the monitoring level of the sleep signal monitoring mode; and the in response to determining that the monitoring mode of the first downlink channel is switched to the second monitoring mode, switching, according to the monitoring level of each monitoring mode, the monitoring mode of the second downlink channel to the fourth monitoring mode includes:

in response to determining that the monitoring level of the second monitoring mode is higher than the monitoring level of the first monitoring mode, determining the monitoring mode with the monitoring level higher than the third monitoring mode as the fourth monitoring mode, and switching the monitoring mode of the second downlink channel to the fourth monitoring mode; or in response to determining that the monitoring level of the second monitoring mode is lower than the monitoring level of the first monitoring mode, determining the monitoring mode with the monitoring level lower than the third monitoring mode as the fourth monitoring mode, and switching the monitoring mode of the second downlink channel to the fourth monitoring mode.

Figure 3:
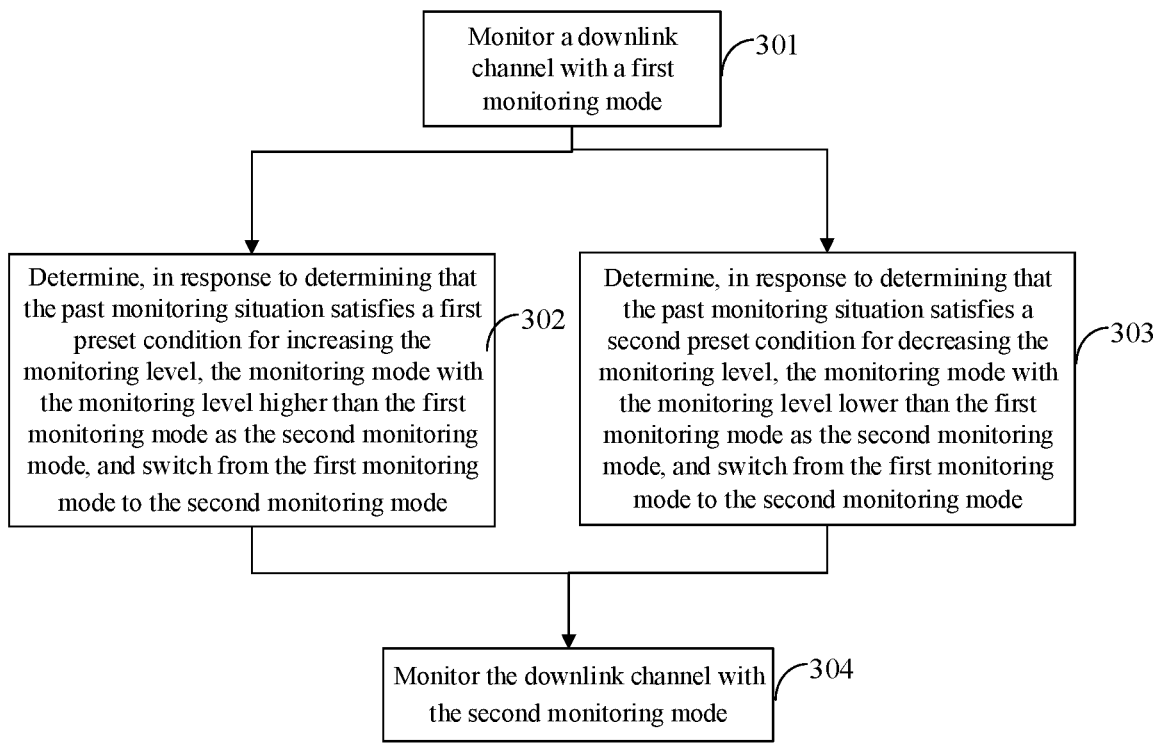
FIG. 3 is a flowchart showing a downlink channel monitoring method according to an embodiment.

FIG. 3 is a flowchart showing a downlink channel monitoring method according to an embodiment. As shown in FIG. 3, the method includes the following steps.

In step 301, monitoring a downlink channel with a first monitoring mode.

In the embodiment of the present disclosure, the base station configures the downlink channel for the terminal and sends instructions to the terminal through the downlink channel, and the terminal monitors the downlink channel and monitors the instructions sent by the base station through the downlink channel, so as to realize communication between the base station and the terminal.

Wherein the downlink channel may be a carrier of a serving cell configured by the base station for the terminal, such as a primary component carrier or a secondary component carrier, or may be Band Width Part (BWP), where the BWP is a terminal's default BWP, an initial BWP, or a terminal designated BWP.

The terminal is provided with the following multiple monitoring modes.

1. Full Monitoring Mode

Figure 4:
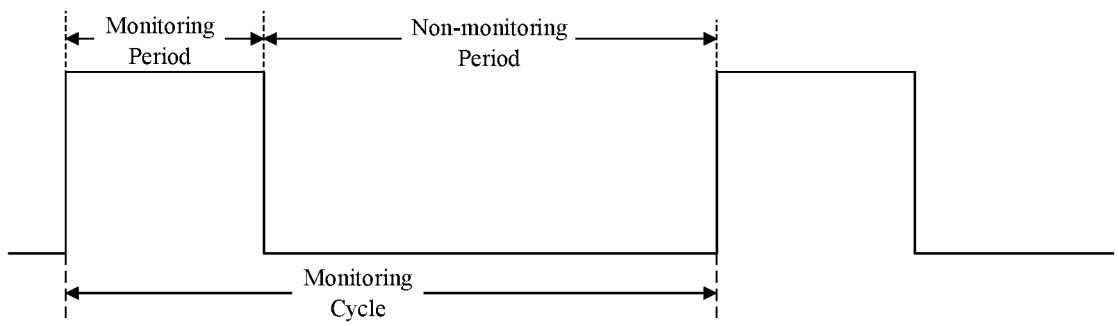
FIG. 4 is a schematic diagram showing a monitoring period according to an embodiment.

A first monitoring rule is set in the full monitoring mode. As shown in FIG. 4, the first monitoring rule includes a monitoring cycle, a start time point and duration of a monitoring period in the monitoring cycle, and a start time point and duration of a non-monitoring period in the monitoring cycle. The start time point of the monitoring period may be expressed by the offset between the start time point and the start time point of the monitoring cycle, and the start time point of the non-monitoring period may be expressed by the offset between the start time point and the start time point of the non-monitoring period.

Further, the first monitoring rule stipulates that: in the full monitoring mode, the terminal monitors the downlink channel during the monitoring period and enters the sleep state and stops monitoring the downlink channel during the non-monitoring period according to the above setting of the monitoring cycle.

2. Wake-up Signal Monitoring Mode

A second monitoring rule is set in the wake-up signal monitoring mode. The second monitoring rule includes the monitoring cycle, the start time point and duration of the monitoring period in the monitoring cycle, and the start time point and duration of the non-monitoring period in the monitoring cycle. Further, a wake-up signal set before the monitoring period is used to indicate whether monitoring is required during the monitoring period.

The second monitoring rule stipulates that: in the wake-up signal monitoring mode, the terminal only monitors the downlink channel during the next monitoring period when the wake-up signal is monitored, and does not monitor the downlink channel during the next monitoring period when the wake-up signal is not monitored by the terminal. In addition, the terminal enters the sleep state and stops monitoring the downlink channel during the non-monitoring period.

3. Sleep Signal Monitoring Mode

A third monitoring rule is set in the sleep signal monitoring mode. The third monitoring rule includes the starting time point of entering the sleep state and the duration of the sleep state. Further, a sleep signal set before the monitoring period is also used to instruct the terminal to enter the sleep state.

The third monitoring rule stipulates that: in the sleep signal monitoring mode, the terminal sleeps according to the starting time point of entering the sleep state and the duration of the sleep state in the sleep signal mode, when it monitors the sleep signal.

The starting time point when the terminal enters the sleep state may be the moment when the terminal monitors the sleep signal, or the moment when a certain preset event occurs after the sleep signal is monitored, or may be other moments.

In one possible implementation, in a carrier aggregation scenario, the terminal is configured with a primary component carrier and a secondary component carrier. For the secondary component carrier, in the sleep signal monitoring mode, the secondary component carrier may be in the sleep state, or the secondary component carrier may be in a deactivated state. When the secondary component carrier is switched from the sleep signal monitoring mode to the wake-up signal monitoring mode or the full monitoring mode, it means that the secondary component carrier is switched from the sleep state or the deactivated state to an active state.

In one possible implementation, the base station and the terminal may negotiate and determine the monitoring rules of the above three monitoring modes. For example, the base station may send the monitoring rules of the three monitoring modes to the terminal through high-level signaling, Media Access Control Control Element (MAC CE) signaling, physical layer signaling or other signaling. Alternatively, the base station may not send them to the terminal through signaling, but the monitoring rules of the three monitoring modes are set in advance in the transmission protocol.

In the embodiment of the present disclosure, the monitoring level is set for each monitoring mode. The monitoring level is used to indicate the frequency of monitoring in the monitoring mode. The higher the monitoring level, the more frequent the monitoring and the more power the terminal consumes. Wherein the monitoring levels of the full monitoring mode, the wake-up signal monitoring mode, and the sleep signal monitoring mode are different. The monitoring level of full monitoring mode is higher than the monitoring level of the wake-up signal monitoring mode, and the monitoring level of the wake-up signal monitoring mode is higher than the monitoring level of the sleep signal monitoring mode.

Wherein the monitoring level of each monitoring mode may be represented by a number, and the size of the number indicates the level of the monitoring level. Alternatively, the monitoring level is represented by letters, and the order of the letters indicates the level of the monitoring level.

In the embodiment of the present disclosure, taking the first monitoring mode as an example, the first monitoring mode is any one of the above multiple monitoring modes. In the process of monitoring the downlink channel with the first monitoring mode, the terminal may determine whether to switch to another monitoring mode according to the past monitoring situation, such that the monitoring mode may be dynamically adjusted according to the past monitoring situation.

In step 302, in response to determining that the past monitoring situation satisfies a first preset condition for increasing the monitoring level, determining the monitoring mode with the monitoring level higher than the first monitoring mode as the second monitoring mode, switching from the first monitoring mode to the second monitoring mode, and performing step 304.

Wherein the past monitoring situation is used to indicate the monitoring situation of the terminal on the downlink channel up to the current moment, may include the monitoring situation within one monitoring period before the current moment, and may also include the monitoring situation within multiple monitoring periods before the current moment.

In the embodiment of the present disclosure, after obtaining the past monitoring situation, the terminal judges whether the past monitoring situation satisfies the preset condition. When it is determined that the past monitoring situation satisfies the preset condition, the first monitoring mode is switched to the second monitoring mode that matches the preset condition according to the monitoring level of each monitoring mode.

Wherein the preset condition is the condition that should be satisfied when switching the monitoring mode, and the preset condition corresponds to one or more matching second monitoring modes. In order to implement flexible switching for various past monitoring situations, the terminal may be set with various preset conditions, and the matching second monitoring mode may be set for each preset condition. Each time, the second monitoring mode that matches the preset condition may be determined according to the preset condition satisfied by the past monitoring situation.

For example, the terminal may be set with a plurality of preset conditions according to the monitoring situation of the downlink channel in different states, for example, taking the condition satisfied by the monitoring situation of the terminal when the downlink channel is in a busy state as the first preset condition, and taking the condition satisfied by the monitoring situation of the terminal when the downlink channel is in an idle state as the second preset condition. When the past monitoring situation satisfies the first preset condition, it indicates that the current downlink channel is in the busy state, and the terminal needs to switch to the monitoring mode with a higher monitoring level to increase the frequency of monitoring and prevent the loss of the target instruction transmitted by the downlink channel. When the past monitoring situation satisfies the second preset condition, it indicates that the current downlink channel is in the idle state, and the terminal needs to switch to the monitoring mode with a lower monitoring level to save power consumption.

The monitoring mode matching the preset condition is determined by the monitoring situation represented by the preset condition and the current monitoring mode. For example, the second monitoring mode matching the first preset condition is the monitoring mode with the monitoring level higher than the current monitoring level, and the second monitoring mode matching the second preset condition is the monitoring mode with the monitoring level lower than the current monitoring level.

As a result, when it is determined that the past monitoring situation satisfies the first preset condition for increasing the monitoring level, the monitoring mode with the monitoring level higher than the first monitoring mode is determined as the second monitoring mode, and the first monitoring mode is switched to the second monitoring mode. When it is determined that the past monitoring situation satisfies the second preset condition for decreasing the monitoring level, the monitoring mode with the monitoring level lower than the first monitoring mode is determined as the second monitoring mode, and the first monitoring mode is switched to the second monitoring mode.

In one possible implementation, the base station sends the preset condition to the terminal through high-level signaling, physical layer signaling, or other signaling. Alternatively, the base station may not send it to the terminal through signaling, but the preset condition is set in advance in the transmission protocol.

Wherein, when the past monitoring situation satisfies the first preset condition, the manner of switching the monitoring mode includes but not limited to the following three manners.

The first manner includes switching the wake-up signal monitoring mode to the full monitoring mode.

In the case that the first monitoring mode is the wake-up signal monitoring mode, the number or frequency of the wake-up signals monitored by the terminal on the downlink channel may represent the instruction transmission condition of the downlink channel. According to the number or frequency of the wake-up signals monitored, it can be determined whether to switch to the monitoring mode with a higher monitoring level. This switching process includes:

1-1. in response to determining that the wake-up signal is monitored for a second preset number of monitoring periods before the current moment, determining the full monitoring mode as the second monitoring mode, and switching the wake-up signal monitoring mode to the full monitoring mode.

Wherein the wake-up signal is sent by the base station through the downlink channel, and is used to instruct the terminal to monitor the downlink channel in the next monitoring period based on the wake-up signal. In the case that the terminal is in the wake-up signal monitoring mode, for the base station, when the base station intends to send the target instruction through the downlink channel, it first sends the wake-up signal through the downlink channel, and then sends the target instruction through the downlink channel in the next monitoring period. For the terminal, when the terminal monitors the wake-up signal, it can monitor the downlink channel in the next monitoring period, so as to monitor the target instruction sent by the base station in the next monitoring period.

In the embodiment of the present disclosure, the terminal may be set with the second preset number, that is, the minimum number of monitoring periods during which the wake-up signal is monitored when the terminal is switched to the monitoring mode with a higher monitoring level. The second preset number may be determined according to the number of wake-up signals sent by the base station when the downlink channel is busier, or may be configured by the base station using other methods for the terminal.

Therefore, in the process of monitoring the wake-up signal on the downlink channel, the terminal may count the number of monitoring periods in which the wake-up signal is monitored, and determine whether the number reaches the second preset number. When it is determined that the counted number has reached the second preset number at a certain moment, that is, the wake-up signal is monitored for the second preset number of monitoring periods before the current moment, it means that the instruction transmission on the current downlink channel is relatively frequent, and a higher monitoring level is required. Thus, the monitoring mode whose monitoring level is higher than the wake-up signal monitoring mode, that is, the full monitoring mode is determined as the second monitoring mode, and the wake-up signal monitoring mode is switched to the full monitoring mode.

Wherein, when counting the number of monitoring periods in which the wake-up signal is monitored, the number of monitoring periods in which the wake-up signal is continuously monitored may be counted. Once there is one monitoring period in which the wake-up signal is not monitored, the counted number is cleared to zero and the count is performed again. Alternatively, regardless of whether the monitoring periods in which the wake-up signal is monitored are continuous or not, the statistics continues, so as to count the number of monitoring periods in which the wake-up signal is monitored.

1-2. in response to determining that a third preset number of the wake-up signal is monitored within a second preset duration before the current moment, determining the full monitoring mode as the second monitoring mode, and switching the wake-up signal monitoring mode to the full monitoring mode.

In the embodiment of the present disclosure, the terminal may be set with the second preset duration and the third preset number, that is, when the terminal is switched to the monitoring mode with a higher monitoring level, the minimum total duration of monitoring periods during which the wake-up signal is monitored within the second preset duration, so as to specify the frequency of monitoring the wake-up signal. The second preset duration and the third preset number may be determined according to the frequency of the wake-up signal sent by the base station when the downlink channel is busier, or may be configured by the base station using other methods for the terminal.

Therefore, in the process of monitoring the wake-up signal on the downlink channel, the terminal may count the number of monitoring periods in which the wake-up signal is monitored and the duration in which the wake-up signal is monitored, obtain the number of the wake-up signal monitored within the second preset duration before the current moment, and determine whether the number reaches the third preset number. When it is determined that the counted number has reached the third preset number, that is, the third preset number of the wake-up signal is monitored within the second preset duration before the current moment, it means that the instruction transmission on the current downlink channel is relatively frequent, and a higher monitoring level is required. Thus, the monitoring mode whose monitoring level is higher than the wake-up signal monitoring mode, that is, the full monitoring mode is determined as the second monitoring mode, and the wake-up signal monitoring mode is switched to the full monitoring mode.

The second manner includes switching the sleep signal monitoring mode to the full monitoring mode.

In the case that the first monitoring mode is the sleep signal monitoring mode, the terminal monitors the sleep signal on the downlink channel to enter the sleep state. When the duration of sleep reaches the preset duration and exiting the sleep signal monitoring mode, it may be determined whether to switch to the monitoring mode with a higher monitoring level. The switching process includes:

2-1. in response to determining that a duration of the sleep state in the sleep signal monitoring mode reaches a fifth preset duration, determining the full monitoring mode as the second monitoring mode, and switching the sleep signal monitoring mode to the full monitoring mode.

Wherein the sleep signal is sent by the base station through the downlink channel, and is used to instruct the terminal to enter the sleep state based on the sleep signal. In the case that the terminal is in the sleep signal monitoring mode, for the base station, when the base station does not need to send the target instruction through the downlink channel, it sends the sleep signal through the downlink channel. For the terminal, when the terminal monitors the sleep signal, it can sleep according to the start time point of entering the sleep state and the duration of the sleep state specified by the sleep signal mode.

In the embodiment of the present disclosure, the terminal may be set with the fifth preset duration, which is the minimum duration of the sleep state. The fifth preset duration may be configured by the base station for the terminal, or negotiated between the base station and the terminal. Also, the fifth preset duration may be determined by the time interval between two adjacent target instructions sent by the base station.

Therefore, in the process of monitoring the sleep signal on the downlink channel, the terminal enters the sleep state after monitoring the sleep signal, and counts the duration of the terminal entering the sleep state to determine whether the duration reaches the fifth preset duration. When it is determined that the statistical duration reaches the fifth preset duration at a certain moment, the terminal exits the sleep signal mode, the monitoring mode whose monitoring level is higher than the sleep signal monitoring mode, that is, the full monitoring mode is determined as the second monitoring mode, and the sleep signal monitoring mode is switched to the full monitor mode.

In the embodiment of the present disclosure, the terminal may set with a seventh preset duration, which is, in the full monitoring mode, the minimum duration during which the target instruction is not monitored when switching back to the sleep signal monitoring mode. The seventh preset duration may be configured by the base station for the terminal, or negotiated between the base station and the terminal.

After the sleep signal monitoring mode is switched to the full monitoring mode, the terminal continues to monitor according to the full monitoring mode, counts the total duration of the monitoring period in which the target instruction is not monitored, and determines whether the duration reaches the seventh preset duration. When it is determined that the statistical duration has reached the seventh preset duration at a certain moment, that is, when the target instruction is not monitored within the seventh preset duration before the current moment, it means that the instruction transmission on the current downlink channel is not frequent. Thus, the sleep signal monitoring mode is determined as the second monitoring mode, and the full monitoring mode is switched back to the sleep signal monitoring mode again, and the fifth preset duration is increased.

Wherein increasing the fifth preset duration may be doubling the fifth preset duration, or increasing the fifth preset duration by a fixed duration, or increasing the fifth preset duration in other ways.

The third manner includes switching the sleep signal monitoring mode to the wake-up signal monitoring mode. The following two items are included.

3-1. in response to determining that the duration of the sleep state in the sleep signal monitoring mode reaches the fifth preset duration, determining the wake-up signal monitoring mode as the second monitoring mode, and switching the sleep signal monitoring mode to the wake-up signal monitoring mode.

Since the monitoring level of the wake-up signal monitoring mode is also higher than that of the sleep signal monitoring mode, when the duration of the terminal in the sleep state reaches the fifth preset duration, the wake-up signal monitoring mode in the monitoring mode whose monitoring level is higher than the sleep signal monitoring mode may also be determined as the second monitoring mode, and the sleep signal monitoring mode is switched to the wake-up monitoring mode.

Whether the terminal switches from the sleep signal monitoring mode to the full monitoring mode or the wake-up signal monitoring mode may be determined according to the configuration of the base station, or determined by the terminal by default, or determined through negotiation between the base station and the terminal.

3-2. in response to determining that the duration of the sleep state in the sleep signal monitoring mode reaches the sixth preset duration, determining the wake-up signal monitoring mode as the second monitoring mode, and switching the sleep signal monitoring mode to the wake-up signal monitoring mode; and in response to determining that the target instruction is not monitored within the seventh preset duration before the current moment, switching the wake-up signal monitoring mode to the sleep signal monitoring mode, monitoring the downlink channel with the sleep signal monitoring mode, and increasing the sixth preset duration.

In the embodiment of the present disclosure, the terminal may set with the sixth preset duration and the seventh preset duration. The sixth preset duration is the minimum duration of the sleep state. The seventh preset duration is, in the wake-up signal monitoring mode, the minimum duration during which the target instruction is not monitored when switching back to the sleep signal monitoring mode. The sixth preset duration and the seventh preset duration may be configured by the base station for the terminal, or negotiated between the base station and the terminal. Also, the sixth preset duration may be determined by the time interval between two adjacent target instructions sent by the base station.

Thus, in the sleep signal monitoring mode, in the process of monitoring the sleep signal on the downlink channel, the terminal enters the sleep state after monitoring the sleep signal, and counts the duration of the terminal entering the sleep state to determine whether the duration reaches the sixth preset duration. When it is determined that the statistical duration reaches the sixth preset duration at a certain moment, the terminal exits sleep signal monitoring mode and switches from the sleep signal monitoring mode to the wake-up signal monitoring mode. Afterwards, in the process of monitoring the wake-up signal on the downlink channel, the total duration of the monitoring period in which the target instruction is not monitored is counted, and it is determined whether the duration reaches the seventh preset duration. When it is determined that the statistical duration has reached the seventh preset duration at a certain moment, that is, the target instruction is not monitored within the seventh preset duration before the current moment, it means that the instruction transmission on the current downlink channel is not frequent. Therefore, the sleep signal monitoring mode is determined as the second monitoring mode, and the wake-up signal monitoring mode is switched back to the sleep signal monitoring mode again, and the sixth preset duration is increased.

Wherein increasing the sixth preset duration may be doubling the sixth preset duration, or increasing the sixth preset duration by a fixed duration, or increasing the sixth preset duration in other ways.

In step 303, in response to determining that the past monitoring situation satisfies a second preset condition for decreasing the monitoring level, determining the monitoring mode with the monitoring level lower than the first monitoring mode as the second monitoring mode, switching from the first monitoring mode to the second monitoring mode, and performing step 304.

Wherein, when the past monitoring situation satisfies the second preset condition, the manner of switching the monitoring mode includes but not limited to the following two manners.

The first manner includes switching the full monitoring mode to the wake-up signal monitoring mode or the sleep signal monitoring mode.

In the case that the first monitoring mode is the full monitoring mode, the number or duration of the target instruction not monitored by the terminal on the downlink channel may represent the instruction transmission condition of the downlink channel. According to the number or duration of the target instruction not monitored, it may be determined whether to switch to the monitoring mode with a lower monitoring level. Any of the following items is included:

1-1. in response to determining that the target instruction is not monitored for the first preset number of monitoring periods before the current moment, determining the wake-up signal monitoring mode or the sleep signal monitoring mode as the second monitoring mode, and switching the full monitoring mode to the second monitoring mode.

In the embodiment of the present disclosure, the terminal may be set with the first preset number, that is, the minimum number of monitoring periods during which the target instruction is not monitored when the terminal is switched to the monitoring mode with a lower monitoring level. The first preset number may be determined according to the number of the target instructions sent by the base station when the downlink channel is more idle, or may be configured by the base station using other methods for the terminal.

Therefore, in the process of monitoring the target instruction on the downlink channel, the terminal may count the number of monitoring periods in which the target instruction is not monitored, and determine whether the number reaches the first preset number. When it is determined that the counted number has reached the first preset number at a certain moment, that is, the target instruction is not monitored for the first preset number of monitoring periods before the current moment, it means that the instruction transmission on the current downlink channel is not frequent, and a lower monitoring level is required. Thus, the monitoring mode whose monitoring level is lower than the full monitoring mode, that is, the wake-up signal monitoring mode or the sleep signal monitoring mode is determined as the second monitoring mode, and the full monitoring mode is switched to the wake-up signal monitoring mode or the sleep signal monitoring mode.

Wherein, when counting the number of monitoring periods in which the target instruction is not monitored, the number of monitoring periods in which the target instruction is continuously not monitored may be counted. Once there is one monitoring period in which the target instruction is monitored, the counted number is cleared to zero and the count is performed again. Alternatively, regardless of whether the monitoring periods in which the target instruction is not monitored are continuous or not, the statistics continues, so as to count the number of monitoring periods in which the target instruction is not monitored.

1-2. in response to determining that the target instruction is not monitored within the first preset duration before the current moment, determining the wake-up signal monitoring mode or the sleep signal monitoring mode as the second monitoring mode, and switching the full monitoring mode to the second monitoring mode.

In the embodiment of the present disclosure, the terminal may be set with the first preset duration, that is, when the terminal is switched to the monitoring mode with a lower monitoring level, the minimum total duration of monitoring periods during which the target instruction is not monitored. The first preset duration may be determined according to the duration required for the target instruction sent by the base station when the downlink channel is idle, or may be configured by the base station using other methods for the terminal.

Therefore, in the process of monitoring the target instruction on the downlink channel, the terminal may count the total duration of monitoring periods in which the target instruction is not monitored, and determine whether the duration reaches the first preset duration. When it is determined that the counted duration has reached the first preset duration at a certain moment, that is, the target instruction is not monitored within the first preset duration before the current moment, it means that the instruction transmission on the current downlink channel is not frequent, and a lower monitoring level is required. Thus, the monitoring mode whose monitoring level is lower than the full monitoring mode, that is, the wake-up signal monitoring mode or the sleep signal monitoring mode is determined as the second monitoring mode, and the full monitoring mode is switched to the wake-up signal monitoring mode or the sleep signal monitoring mode.

Wherein, when counting the total monitoring duration in which the target instruction is not monitored, the total monitoring duration in which the target instruction is continuously not monitored may be counted. Once there is one monitoring period in which the target instruction is monitored, the counted number is cleared to zero and the count is performed again. Alternatively, regardless of whether the monitoring periods in which the target instruction is not monitored are continuous or not, the statistics continues, so as to count the total duration in which the target instruction is not monitored.

It should be noted that the switch from the full monitoring mode to the wake-up signal monitoring mode or the sleep signal monitoring mode may be determined according to the configuration of the base station, or determined by the terminal by default, or negotiated between the base station and the terminal.

The second manner includes switching the wake-up signal monitoring mode to the sleep signal monitoring mode.

In the case that the first monitoring mode is the wake-up signal monitoring mode, the number, duration, or frequency of the wake-up signals not monitored by the terminal on the downlink channel may represent the instruction transmission condition of the downlink channel. According to the number, duration, or frequency of the wake-up signals monitored, it can be determined whether to switch to the monitoring mode with a lower monitoring level. Wherein at least one of the following items is included:

2-1. in response to determining that the wake-up signal is not monitored for the fourth preset number of monitoring periods before the current moment, determining the sleep signal monitoring mode as the second monitoring mode, and switching the wake-up signal monitoring mode to the sleep signal monitoring mode.

In the embodiment of the present disclosure, the terminal may be set with the fourth preset number, that is, the minimum number of monitoring periods during which the wake-up signal is not monitored when the terminal is switched to the monitoring mode with a lower monitoring level. The fourth preset number may be determined according to the number of the wake-up signals sent by the base station when the downlink channel is more idle, or may be configured by the base station using other methods for the terminal.

Therefore, in the process of monitoring the wake-up signal on the downlink channel, the terminal may count the number of monitoring periods in which the wake-up signal is not monitored, and determine whether the number reaches the fourth preset number. When it is determined that the counted number has reached the fourth preset number at a certain moment, that is, the wake-up signal is not monitored for the fourth preset number of monitoring periods before the current moment, it means that the instruction transmission on the current downlink channel is not frequent, and a lower monitoring level is required. Thus, the monitoring mode whose monitoring level is lower than the wake-up signal monitoring mode, that is, the sleep signal monitoring mode is determined as the second monitoring mode, and the wake-up signal monitoring mode is switched to the sleep signal monitoring mode.

Wherein, when counting the number of monitoring periods in which the wake-up signal is not monitored, the number of monitoring periods in which the wake-up signal is continuously not monitored may be counted. Once there is one monitoring period in which the wake-up signal is monitored, the counted number is cleared to zero and the count is performed again. Alternatively, regardless of whether the monitoring periods in which the wake-up signal is not monitored are continuous or not, the statistics continues, so as to count the number of monitoring periods in which the wake-up signal is not monitored.

2-2. in response to determining that the wake-up signal is not monitored within the third preset duration before the current moment, determining the sleep signal monitoring mode as the second monitoring mode, and switching the wake-up signal monitoring mode to the sleep signal monitoring mode.

In the embodiment of the present disclosure, the terminal may be set with the third preset duration, that is, when the terminal is switched to the monitoring mode with a lower monitoring level, the minimum total duration of monitoring periods during which the wake-up signal is not monitored. The third preset duration may be determined according to the duration required for the wake-up signal sent by the base station when the downlink channel is more idle, or may be configured by the base station using other methods for the terminal.

Therefore, in the process of monitoring the wake-up signal on the downlink channel, the terminal may count the total duration of monitoring periods in which the wake-up signal is not monitored, and determine whether the duration reaches the third preset duration. When it is determined that the counted duration has reached the third preset duration at a certain moment, that is, the wake-up signal is not monitored within the third preset duration before the current moment, it means that the instruction transmission on the current downlink channel is not frequent, and a lower monitoring level is required. Thus, the monitoring mode whose monitoring level is lower than the wake-up signal monitoring mode, that is, the sleep signal monitoring mode is determined as the second monitoring mode, and the wake-up signal monitoring mode is switched to the sleep signal monitoring mode.

Wherein, when counting the total monitoring duration in which the wake-up signal is not monitored, the total monitoring duration in which the wake-up signal is continuously not monitored may be counted. Once there is one monitoring period in which the wake-up signal is monitored, the counted number is cleared to zero and the count is performed again. Alternatively, regardless of whether the monitoring periods in which the wake-up signal is not monitored are continuous or not, the statistics continues, so as to count the total duration in which the wake-up signal is not monitored.

2-3. in response to determining that the fifth preset number of the wake-up signal is not monitored within a fourth preset duration before the current moment, determining the sleep signal monitoring mode as the second monitoring mode, and switching the wake-up signal monitoring mode to the sleep signal monitoring mode.

In the embodiment of the present disclosure, the terminal may set with the fourth preset duration and the fifth preset number, that is, when the terminal is switched to the monitoring mode with a lower monitoring level, the minimum total number of monitoring periods during which the wake-up signal is not monitored within the fourth preset duration, so as to specify the frequency of not monitoring the wake-up signal. The fourth preset duration and the fifth preset number may be determined according to the frequency of the wake-up signal sent by the base station when the downlink channel is more idle, or may be configured by the base station using other methods for the terminal.

Therefore, in the process of monitoring the wake-up signal on the downlink channel, the terminal may count the number of monitoring periods in which the wake-up signal is not monitored and the duration in which the wake-up signal is not monitored, obtain the number of the wake-up signal not monitored within the fourth preset duration before the current moment, and determine whether the number reaches the fifth preset number. When it is determined that the counted number has reached the fifth preset number, that is, the fifth preset number of the wake-up signal is not monitored within the fourth preset duration before the current moment, it means that the instruction transmission on the current downlink channel is not frequent, and a lower monitoring level is required. Thus, the monitoring mode whose monitoring level is lower than the wake-up signal monitoring mode, that is, the sleep signal monitoring mode is determined as the second monitoring mode, and the wake-up signal monitoring mode is switched to the sleep signal monitoring mode.

It should be noted that the above first preset number, the second preset number, the third preset number, the fourth preset number, and the fifth preset number may be equal or unequal. The first preset duration, the second preset duration, the third preset duration, the fourth preset duration, the fifth preset duration, the sixth preset duration, and the seventh preset duration may be equal or unequal.

In step 304, monitoring the downlink channel with the second monitoring mode.

When determining that the past monitoring situation satisfies the preset condition, the terminal switches to the second monitoring mode that matches the preset condition. Thus, the second monitoring mode is different from the first monitoring mode. Then, the manner of the monitoring the downlink channel with the second monitoring mode is similar to step 301, which will not be repeated herein.

In the method provided by the embodiment of the present disclosure, the terminal is provided with the plurality of monitoring modes with different monitoring levels. In the process of monitoring the downlink channel with the first monitoring mode, when it is determined that the past monitoring situation satisfies the preset condition, the first monitoring mode is switched, according to the monitoring level of each monitoring mode, to the second monitoring mode that matches the preset condition, and the downlink channel is monitored with the second monitoring mode which is different from the first monitoring mode, thereby dynamically adjusting the monitoring mode according to the past monitoring situation, and implementing flexible switching between different monitoring modes, which can not only save power, but also avoid the situation that the adopted monitoring mode does not meet the current transmission situation and misses the target instruction. Moreover, a fixed monitoring mode is no longer used for monitoring, which improves the degree of intelligence.

It should be noted that the embodiment takes one downlink channel as an example for description, and the number of the downlink channel may be one or more. When the number of the downlink channel is multiple, the method for the terminal to monitor the downlink channel will be described in detail in the following embodiments.

Figure 5:
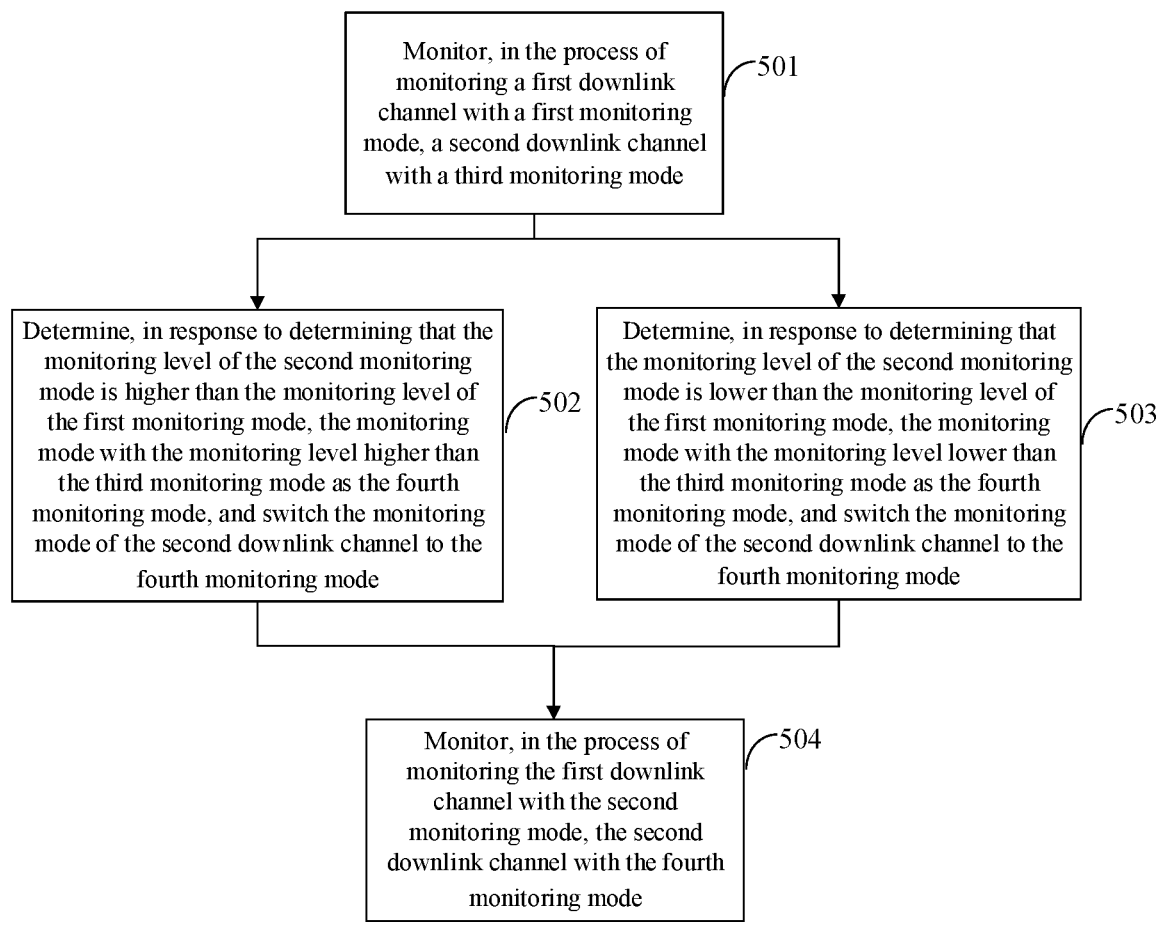
FIG. 5 is a flowchart showing a downlink channel monitoring method according to an embodiment.

FIG. 5 is a flowchart showing a downlink channel monitoring method according to an embodiment. In this embodiment, the terminal monitors the first downlink channel and the second downlink channel as an example for description. As shown in FIG. 5, the method includes the following steps.

In step 501, in the process of monitoring a first downlink channel with a first monitoring mode, monitoring a second downlink channel with a third monitoring mode.

The base station may configure a plurality of downlink channels for the terminal, such that the base station may send target instructions through the plurality of downlink channels, and the terminal monitors the plurality of downlink channels and monitors the target instructions sent by the base station through the plurality of downlink channels. For example, the plurality of downlink channels include a main downlink channel and at least one auxiliary downlink channel. Since the instruction transmission of the main downlink channel is generally more frequent than the instruction transmission of the auxiliary downlink channel, the monitoring level of the main downlink channel is not lower than the monitoring level of the auxiliary downlink channel when the terminal monitors these downlink channels.

In the embodiment of the present disclosure, taking the terminal monitoring the first downlink channel and the second downlink channel as an example, the process of switching the monitoring modes of the two downlink channels will be described. Wherein the first downlink channel is the main downlink channel and the second downlink channel is the auxiliary downlink channel, and the monitoring level of the third monitoring mode of the terminal monitoring the second downlink channel is not higher than the monitoring level of the first monitoring mode of the terminal monitoring the first downlink channel.

In step 502, in response to determining that the monitoring level of the second monitoring mode is higher than the monitoring level of the first monitoring mode, determining the monitoring mode with the monitoring level higher than the third monitoring mode as the fourth monitoring mode, and switching the monitoring mode of the second downlink channel to the fourth monitoring mode.

The monitoring mode of the second downlink channel is related to the monitoring mode of the first downlink channel. Thus, the terminal needs to obtain the monitoring mode of the first downlink channel at any time. When it is determined that the monitoring mode of the first downlink channel is switched, the monitoring mode of the second downlink channel may be switched accordingly.

In the process of acquiring the monitoring mode of the first downlink channel, when it is determined that the monitoring mode of the first downlink channel is switched to the second monitoring mode, the monitoring mode of the second downlink channel is switched, according to the monitoring level of each monitoring mode, to the fourth monitoring mode, such that the monitoring level change trend of the second downlink channel matches the monitoring level change trend of the first downlink channel. Wherein the matching refers to: when the monitoring level of the first downlink channel is increased, the monitoring level of the second downlink channel is increased; and when the monitoring level of the first downlink channel is decreased, the monitoring level of the second downlink channel is decreased.

Wherein, according to the monitoring level of each monitoring mode, the change trend of the monitoring levels of the first monitoring mode and the second monitoring mode of the first downlink channel may be determined, that is, it is determined whether the monitoring level is increased or decreased when the first monitoring mode is switched to the second monitoring mode. As a result, when the monitoring mode of the second downlink channel is switched, it is possible to determine the matching fourth monitoring mode according to the change trend of the monitoring levels and the current third monitoring mode of the second downlink channel.

In one possible implementation, when it is determined that the monitoring level of the second monitoring mode is higher than the monitoring level of the first monitoring mode, the monitoring mode with the monitoring level higher than the third monitoring mode is determined as the fourth monitoring mode, and the monitoring mode of the second downlink channel is switched to the fourth monitoring mode.

Wherein, when the monitoring mode of the first downlink channel is switched from the wake-up signal monitoring mode to the monitoring mode with a higher monitoring level, the monitoring mode switching process of the second downlink channel includes but not limited to the following two manners.

In the first manner, the monitoring mode of the second downlink channel is the sleep signal monitoring mode. When it is determined that the monitoring mode of the first downlink channel is switched from the wake-up signal monitoring mode to the full monitoring mode, the monitoring mode of the second downlink channel is switched to the wake-up signal monitoring mode.

In the second manner, the monitoring mode of the second downlink channel is the sleep signal monitoring mode. When it is determined that the monitoring mode of the first downlink channel is switched from the wake-up signal monitoring mode to the full monitoring mode, the monitoring mode of the second downlink channel is switched to the full monitoring mode.

Wherein the process of switching the monitoring mode of the first downlink channel from the wake-up signal monitoring mode to the full monitoring mode is similar to the process of switching from the wake-up signal monitoring mode to the full monitoring mode in the above embodiments, and will not be repeated herein.

Wherein, when the monitoring mode of the first downlink channel is switched from the sleep signal monitoring mode to the monitoring mode with a higher monitoring level, the monitoring mode switching process of the second downlink channel includes but not limited to the following two manners.

In the first manner, the monitoring mode of the second downlink channel is the sleep signal monitoring mode. When it is determined that the monitoring mode of the first downlink channel is switched from the sleep signal monitoring mode to the full monitoring mode, the monitoring mode of the second downlink channel is switched to the wake-up signal monitoring mode.

In the second manner, the monitoring mode of the second downlink channel is the sleep signal monitoring mode. When it is determined that the monitoring mode of the first downlink channel is switched from the sleep signal monitoring mode to the wake-up signal monitoring mode, the monitoring mode of the second downlink channel is switched to the wake-up signal monitoring mode, or not switched.

In step 503, in response to determining that the monitoring level of the second monitoring mode is lower than the monitoring level of the first monitoring mode, determining the monitoring mode with the monitoring level lower than the third monitoring mode as the fourth monitoring mode, and switching the monitoring mode of the second downlink channel to the fourth monitoring mode.

Wherein the following three situations are included, but it is not limited thereto.

In the first situation, the monitoring mode of the first downlink channel is the full monitoring mode, and the monitoring mode of the second downlink channel is the full monitoring mode too. When it is determined that the monitoring mode of the first downlink channel is switched to the wake-up signal monitoring mode, the monitoring mode of the second downlink channel is switched to the sleep signal monitoring mode.

Wherein the process of switching the monitoring mode of the first downlink channel from the full monitoring mode to the wake-up signal monitoring mode is similar to the process of switching from the full monitoring mode to the wake-up signal monitoring mode in the above embodiments, and will not be repeated herein.

In the second situation, the monitoring mode of the first downlink channel is the wake-up signal monitoring mode, and the monitoring mode of the second downlink channel is the wake-up signal monitoring mode too. When it is determined that the monitoring mode of the first downlink channel is switched to the sleep signal monitoring mode, the monitoring mode of the second downlink channel is switched to the sleep signal monitoring mode.

Wherein the process of switching the monitoring mode of the first downlink channel from the wake-up signal monitoring mode to the sleep signal monitoring mode is similar to the process of switching from the wake-up signal monitoring mode to the sleep signal monitoring mode in the above embodiments, and will not be repeated herein.

In the third situation, the monitoring mode of the first downlink channel is the full monitoring mode, and the monitoring mode of the second downlink channel is the wake-up signal monitoring mode. When it is determined that the monitoring mode of the first downlink channel is switched to the wake-up signal monitoring mode, the monitoring mode of the second downlink channel is switched to the sleep signal monitoring mode.

In step 504, in the process of monitoring the first downlink channel with the second monitoring mode, monitoring the second downlink channel with the fourth monitoring mode.

The manner in which the terminal monitors the first downlink channel with the second monitoring mode and monitors the second downlink channel with the fourth monitoring mode is similar to step 401, and will not be repeated herein.

It should be noted that when the downlink channels configured by the base station for the terminal include other downlink channels in addition to the first downlink channel and the second downlink channel, it is possible to determine the monitoring mode to be switched for other downlink channels by the level change of the monitoring mode of the first downlink channel, and the switching manner thereof is similar to the switching manner of the monitoring mode of the second downlink channel and will not be repeated herein.

Another point that needs to be explained is that when the base station configures the plurality of downlink channels for the terminal, it is determined whether other downlink channels need to be switched according to the switching process of the first downlink channel.

In one possible implementation, when the monitoring mode of the first downlink channel is switched, the monitoring modes of the other downlink channels may all be synchronously switched. Alternatively, when the other downlink channels include multiple downlink channels, the multiple downlink channels may be switched in sequence. Taking the second downlink channel and the third downlink channel as an example, when the past monitoring situation of the first downlink channel satisfies a certain preset condition, the monitoring mode of the second downlink channel, instead of the third downlink channel, is switched. When the past monitoring situation of the first downlink channel satisfies another preset condition, the monitoring mode of the third downlink channel is switched. Wherein, there is a progressive relationship between these two preset conditions, which means that the transmission frequency between the base station and the terminal increases or decreases sequentially.

For example, when the terminal monitors the first downlink channel with the wake-up signal monitoring mode and monitors the second downlink channel and the third downlink channel with the sleep signal monitoring mode, and the number of the target instruction monitored by the terminal on the first downlink channel reaches a smaller preset number, the first downlink channel is switched to the full monitoring mode, the second downlink channel is switched to the wake-up signal monitoring mode, and the monitoring mode of the third monitoring channel remains unchanged. Then, when the number of the target instruction monitored by the terminal on the first downlink channel reaches another larger preset number, the monitoring mode of the third downlink channel is switched to the wake-up signal monitoring mode.

In addition, when the base station configures each downlink channel for the terminal, it may also send the preset condition corresponding to the downlink channel to the terminal, such that the monitoring mode of the corresponding downlink channel is switched in time, when the past monitoring situation of the first downlink channel satisfies the preset condition.

By adopting the above method, it is possible to control the other multiple downlink channels to switch in sequence according to the transmission situation of the first downlink channel, realize the stepped switching when the transmission frequency increases or decreases sequentially, ensure that the downlink channel switched each time matches the current transmission frequency, and avoid switching all downlink channels and consuming too much power of the terminal.

It should be noted that the above first downlink channel, second downlink channel, and third downlink channel may be the carrier of the serving cell configured by the base station for the terminal, such as the primary component carrier or the secondary component carrier, or may be the BWP, where the BWP is the terminal's default BWP, the initial BWP, or the terminal designated BWP.

In the method provided by the embodiments of the present disclosure, the base station may configure the plurality of downlink channels for the terminal, and in the process of monitoring the first downlink channel with the first monitoring mode, the second downlink channel is monitored with the third monitoring mode. When it is determined that the monitoring mode of the first downlink channel is switched to the second monitoring mode, the monitoring mode of the second downlink channel is switched, according to the monitoring level of each monitoring mode, to the fourth monitoring mode, such that the monitoring level change trend of the second downlink channel matches the monitoring level change trend of the first downlink channel. In the process of monitoring the first downlink channel with the second monitoring mode, the second downlink channel is monitored with the fourth monitoring mode, so as to dynamically adjust the monitoring modes of other downlink channels according to the change of the monitoring level of the first downlink channel, and realize the flexible switching between different monitoring modes of the plurality of downlink channels, which not only saves power, which can not only save power, but also avoid the situation that the adopted monitoring mode does not meet the current transmission situation and misses the target instruction. It is also suitable for carrier aggregation or dual connectivity, or other scenarios where the plurality of downlink channels are configured.

Figure 6:
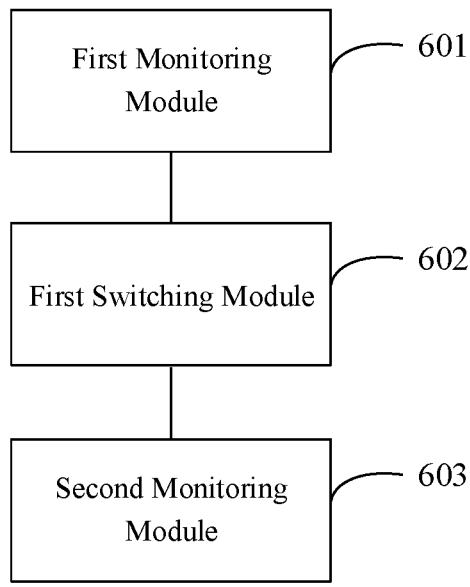
FIG. 6 is a block diagram showing a terminal according to an embodiment.

FIG. 6 is a block diagram showing a terminal according to an embodiment. As shown in FIG. 6, the terminal includes a first monitoring module 601, a first switching module 602, and a second monitoring module 603.

The first monitoring module 601 is for monitoring a downlink channel with a first monitoring mode, the first monitoring mode being a full monitoring mode, a wake-up signal monitoring mode, or a sleep signal monitoring mode, the monitoring levels of the full monitoring mode, the wake-up signal monitoring mode, and the sleep signal monitoring mode being different.

The first switching module 602 is for switching, according to the monitoring level of each monitoring mode, the first monitoring mode to a second monitoring mode that matches a preset condition, in response to determining that a past monitoring situation satisfies the preset condition.

The second monitoring module 603 is for monitoring the downlink channel with the second monitoring mode, the second monitoring mode being different from the first monitoring mode.

In the terminal provided by the embodiments of the present disclosure, it is provided with a plurality of monitoring modes with different monitoring levels. In the process of monitoring the downlink channel with the first monitoring mode, when it is determined that the past monitoring situation satisfies the preset condition, the first monitoring mode is switched, according to the monitoring level of each monitoring mode, to the second monitoring mode that matches the preset condition, and the downlink channel is monitored with the second monitoring mode which is different from the first monitoring mode, thereby dynamically adjusting the monitoring mode according to the past monitoring situation, implementing flexible switching between different monitoring modes, instead of only using a fixed monitoring mode for monitoring, and improving the degree of intelligence.

In one possible implementation, the monitoring level of the full monitoring mode is higher than the monitoring level of the wake-up signal monitoring mode, and the monitoring level of the wake-up signal monitoring mode is higher than the monitoring level of the sleep signal monitoring mode; and the first switching module 602 is for:

in response to determining that the past monitoring situation satisfies the first preset condition for increasing the monitoring level, determining the monitoring mode with the monitoring level higher than the first monitoring mode as the second monitoring mode, and switching the first monitoring mode to the second monitoring mode; or in response to determining that the past monitoring situation satisfies the second preset condition for decreasing the monitoring level, determining the monitoring mode with the monitoring level lower than the first monitoring mode as the second monitoring mode, and switching the first monitoring mode to the second monitoring mode.

In one possible implementation, the first monitoring mode is the full monitoring mode, and the first switching module 602 includes a first switching unit;

the first switching unit is for determining the wake-up signal monitoring mode or the sleep signal monitoring mode as the second monitoring mode, and switching the full monitoring mode to the second monitoring mode, in response to determining that a target instruction is not monitored for a first preset number of monitoring periods before the current moment; or the first switching unit is also for determining the wake-up signal monitoring mode or the sleep signal monitoring mode as the second monitoring mode, and switching the full monitoring mode to the second monitoring mode, in response to determining that the target instruction is not monitored within a first preset duration before the current moment.

In one possible implementation, the first monitoring mode is the wake-up signal monitoring mode, and the first switching module 602 includes a second switching unit;

the second switching unit is configured to perform at least one of:

in response to determining that a wake-up signal is monitored for a second preset number of monitoring periods before the current moment, determining the full monitoring mode as the second monitoring mode, and switching the wake-up signal monitoring mode to the full monitoring mode; and in response to determining that a third preset number of the wake-up signal is monitored within a second preset duration before the current moment, determining the full monitoring mode as the second monitoring mode, and switching the wake-up signal monitoring mode to the full monitoring mode.

In one possible implementation, the first monitoring mode is the wake-up signal monitoring mode, and the first switching module 602 includes a third switching unit;

the third switching unit is configured to perform at least one of:

in response to determining that a wake-up signal is not monitored for a fourth preset number of monitoring periods before the current moment, determining the sleep signal monitoring mode as the second monitoring mode, and switching the wake-up signal monitoring mode to the sleep signal monitoring mode;

in response to determining that the wake-up signal is not monitored within a third preset duration before the current moment, determining the sleep signal monitoring mode as the second monitoring mode, and switching the wake-up signal monitoring mode to the sleep signal monitoring mode; and in response to determining that a fifth preset number of the wake-up signal is not monitored within a fourth preset duration before the current moment, determining the sleep signal monitoring mode as the second monitoring mode, and switching the wake-up signal monitoring mode to the sleep signal monitoring mode.

In one possible implementation, the first monitoring mode is the wake-up signal monitoring mode, and the first switching module 602 includes:

a fourth switching unit for determining the full monitoring mode or the wake-up signal monitoring mode as the second monitoring mode, and switching the sleep signal monitoring mode to the second monitoring mode, in response to determining that a duration of the sleep state in the sleep signal monitoring mode reaches a fifth preset duration.

In one possible implementation, the first monitoring mode is the wake-up signal monitoring mode, and the first switching module 602 includes:

a fifth switching unit for determining the wake-up signal monitoring mode as the second monitoring mode, and switching the sleep signal monitoring mode to the wake-up signal monitoring mode, in response to determining that a duration of the sleep state in the sleep signal monitoring mode reaches a sixth preset duration; and a sixth switching unit for switching the wake-up signal monitoring mode to the sleep signal monitoring mode, monitoring the downlink channel with the sleep signal monitoring mode, and increasing the sixth preset duration, in response to determining that a target instruction is not monitored within a seventh preset duration before the current moment.

In one possible implementation, the downlink channel is a first downlink channel, and the terminal further includes:

a third monitoring module for monitoring a second downlink channel with a third monitoring mode, in the process of monitoring the first downlink channel with the first monitoring mode; the monitoring level of the third monitoring mode being not higher than that of the first monitoring mode;

a second switching module for switching the monitoring mode of the second downlink channel to a fourth monitoring mode according to the monitoring level of each monitoring mode, such that a monitoring level change trend of the second downlink channel matches the monitoring level change trend of the first downlink channel, in response to determining that the monitoring mode of the first downlink channel is switched to the second monitoring mode; and a fourth monitoring module for monitoring the second downlink channel with the fourth monitoring mode, in the process of monitoring the first downlink channel with the second monitoring mode.

In one possible implementation, the monitoring level of the full monitoring mode is higher than the monitoring level of the wake-up signal monitoring mode, and the monitoring level of the wake-up signal monitoring mode is higher than the monitoring level of the sleep signal monitoring mode; and the third switching module includes:

a seventh switching unit for determining the monitoring mode with the monitoring level higher than the third monitoring mode as the fourth monitoring mode, and switching the monitoring mode of the second downlink channel to the fourth monitoring mode, in response to determining that the monitoring level of the second monitoring mode is higher than the monitoring level of the first monitoring mode; or an eighth switching unit for determining the monitoring mode with the monitoring level lower than the third monitoring mode as the fourth monitoring mode, and switching the monitoring mode of the second downlink channel to the fourth monitoring mode, in response to determining that the monitoring level of the second monitoring mode is lower than the monitoring level of the first monitoring mode.

It should be noted that when the terminal provided in the above embodiments monitors the downlink channel, the division of the above functional modules is only used for illustration. In practical applications, the above functional allocation may be completed by different functional modules as required, that is, the internal structure of the terminal is divided into different functional modules to complete all or part of the functions described above. In addition, the terminal embodiments provided in the above embodiments and the downlink channel monitoring method embodiments belong to the same concept, and the specific implementation process is described in detail in the method embodiments, which will not be repeated herein.

Figure 7:
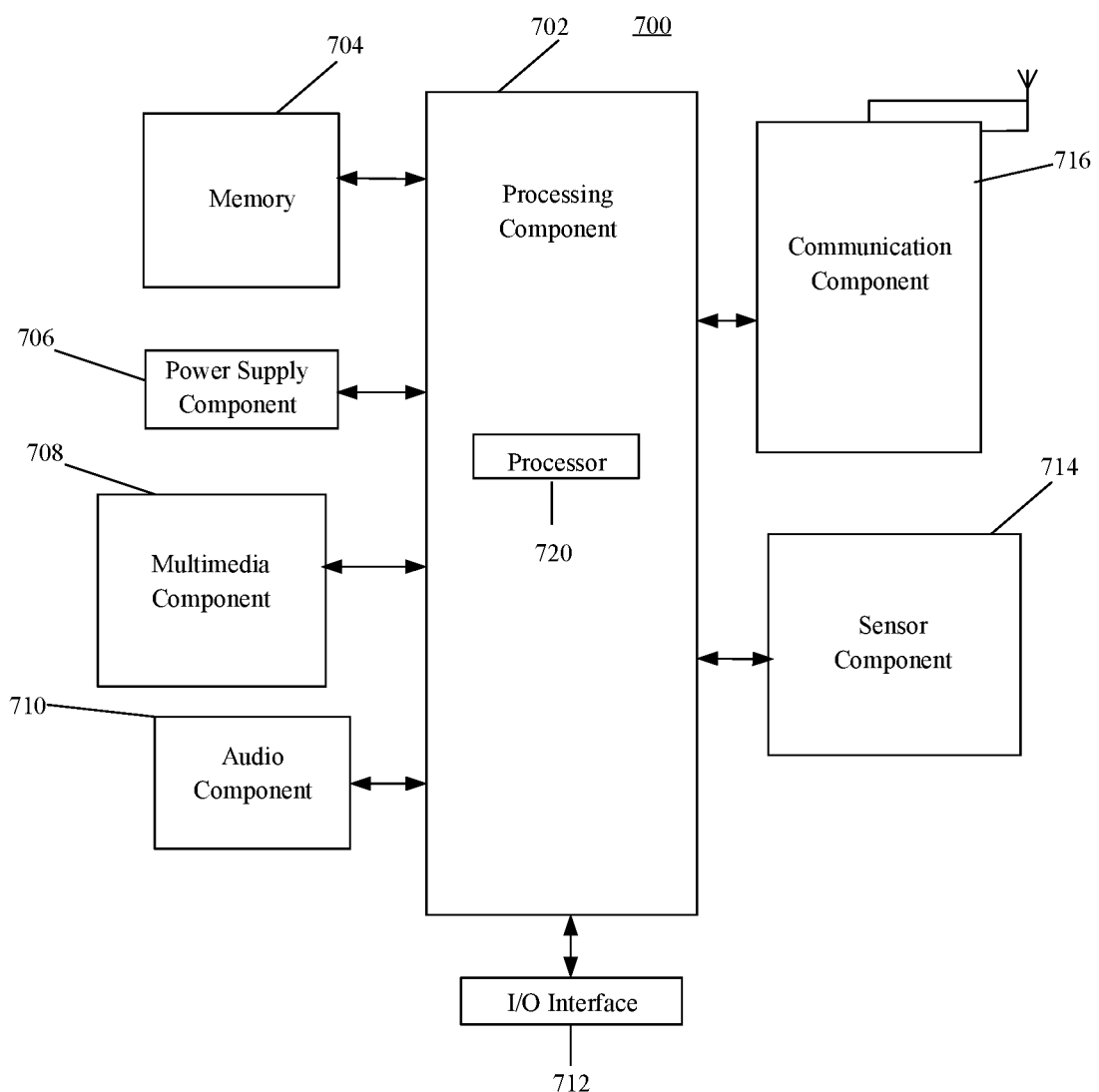
FIG. 7 is a block diagram showing a terminal according to an embodiment.

FIG. 7 is a block diagram showing a terminal 700 according to an embodiment. Referring to FIG. 7, for example, the terminal 700 may be a mobile phone, a computer, a digital broadcast device, a messaging device, a game console, a tablet device, a medical device, a fitness device, a personal digital assistant, and the like.

Referring to FIG. 7, the terminal 700 may include one or more of the following components: a processing component 702, a memory 704, a power supply component 706, a multimedia component 708, an audio component 710, an input/output (I/O) interface 712, a sensor component 714, and a communication component 716.

The processing component 702 generally controls the overall operations of the terminal 700, such as the operations associated with display, telephone calls, data communications, camera operations, and recording operations. The processing component 702 may include one or more processors 720 to execute instructions to complete all or part of the steps of the above method. Moreover, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support operations in the terminal 700. Examples of these data include instructions for any application or method operated on the terminal 700, contact data, phone book data, messages, pictures, videos, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 706 provides power to various components of the terminal 700. The power supply component 706 may include a power management system, one or more power supplies, and other components associated with the generation, management, and distribution of power for the terminal 700.

The multimedia component 708 includes a screen providing an output interface between the terminal 700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 708 includes a front camera and/or a rear camera. The front camera and the rear camera may receive an external multimedia datum while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the terminal 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the terminal 700. For example, the sensor component 714 may detect an open/closed status of the terminal 700, relative positioning of components, e.g., the display and the keypad, of the terminal 700, a change in position of the terminal 700 or a component of the terminal 700, a presence or absence of user contact with the terminal 700, an orientation or an acceleration/deceleration of the terminal 700, and a change in temperature of the terminal 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal 700 and other devices. The terminal 700 can access a wireless network based on a communication standard, such as Wi-Fi, 2G, or 3G, or a combination thereof. In an embodiment, the communication component 716 receives a broadcast signal or broadcast associated information from an external broadcast management system via a broadcast channel. In one embodiment, the communication component 716 further includes a near field communication (NFC) module to facilitate short-range communications.

In an embodiment, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described downlink channel monitoring method.

In an embodiment, there is also provided a non-transitory computer-readable storage medium including instructions, such as included in the memory 704, executable by the processor 720 in the terminal 700, for performing the above-described methods. For example, the non-transitory computer-readable storage medium may be a ROM, a RAM, a CD-ROM, a magnetic tape, a floppy disc, an optical data storage device, and the like.

With the downlink channel monitoring method, terminal, and storage medium provided by the embodiments of the present disclosure, by providing a plurality of monitoring modes with different monitoring levels, in the process of monitoring the downlink channel with the first monitoring mode, when it is determined that the past monitoring situation satisfies the preset condition, the first monitoring mode is switched, according to the monitoring level of each monitoring mode, to the second monitoring mode that matches the preset condition, and the downlink channel is monitored with the second monitoring mode which is different from the first monitoring mode, thereby dynamically adjusting the monitoring mode according to the past monitoring situation, implementing flexible switching between different monitoring modes, instead of only using a fixed monitoring mode for monitoring, and improving the degree of intelligence.

Those of ordinary skill in the art can understand that all or part of the steps in the above embodiments may be implemented by hardware, or by a program to instruct relevant hardware to complete, and the program may be stored in a machine-readable storage medium. The above-mentioned storage medium may be a read-only memory, a magnetic disk, an optical disk, or the like.

The above description is only some optional embodiments of the embodiments of the present disclosure, and is not intended to limit the present disclosure. Any modification, equivalent replacement, improvement, and the like, made within the spirit and principle of the embodiments of the present disclosure should be included in the scope of the embodiments of the present disclosure.

What is claimed is:

1. A downlink channel monitoring method, comprising:
   monitoring, by a terminal, a downlink channel with a first monitoring mode, the first monitoring mode comprising a full monitoring mode, a wake-up signal monitoring mode, or a sleep signal monitoring mode, monitoring levels of the full monitoring mode, the wake-up signal monitoring mode, and the sleep signal monitoring mode being different;
   switching, by the terminal and in response to determining that a monitoring situation satisfies a preset condition, a monitoring mode from the first monitoring mode to a second monitoring mode matching the preset condition according to the monitoring levels; and
   monitoring, by the terminal, the downlink channel with the second monitoring mode, the second monitoring mode being different from the first monitoring mode,
   wherein the downlink channel is a first downlink channel, and the method further comprises:
   monitoring, in a process of monitoring the first downlink channel with the first monitoring mode, a second downlink channel with a third monitoring mode, a monitoring level of the third monitoring mode being not higher than a monitoring level of the first monitoring mode;
   switching, in response to determining that the monitoring mode of the first downlink channel is switched to the second monitoring mode, a monitoring mode of the second downlink channel to a fourth monitoring mode according to the monitoring levels, so as to cause a monitoring level change trend of the second downlink channel to match a monitoring level change trend of the first downlink channel; and
   monitoring, in a process of monitoring the first downlink channel with the second monitoring mode, the second downlink channel with the fourth monitoring mode.

2. The method according to claim 1, wherein a monitoring level of the full monitoring mode is higher than a monitoring level of the wake-up signal monitoring mode, and the monitoring level of the wake-up signal monitoring mode is higher than a monitoring level of the sleep signal monitoring mode; and
   wherein switching, in response to determining that the monitoring situation satisfies the preset condition, the monitoring mode from the first monitoring mode to the second monitoring mode matching the preset condition according to the monitoring levels comprises at least one of following acts:
   determining, in response to determining that the monitoring situation satisfies a first preset condition for increasing the monitoring level, a monitoring mode with a higher monitoring level than the first monitoring mode as the second monitoring mode; or
   determining, in response to determining that the monitoring situation satisfies a second preset condition for decreasing the monitoring level, a monitoring mode with a lower monitoring level than the first monitoring mode as the second monitoring mode.

3. The method according to claim 1, wherein the first monitoring mode is the full monitoring mode, and switching, in response to determining that the monitoring situation satisfies the preset condition, the monitoring mode from the first monitoring mode to the second monitoring mode matching the preset condition according to the monitoring levels comprises at least one of following acts:
   determining, in response to detecting no target instruction for a first preset number of monitoring periods before a current moment, the wake-up signal monitoring mode or the sleep signal monitoring mode as the second monitoring mode; or
   determining, in response to detecting no target instruction within a first preset duration before the current moment, the wake-up signal monitoring mode or the sleep signal monitoring mode as the second monitoring mode.

4. The method according to claim 1, wherein the first monitoring mode is the wake-up signal monitoring mode, and switching, in response to determining that the monitoring situation satisfies the preset condition, the monitoring mode from the first monitoring mode to the second monitoring mode matching the preset condition according to the monitoring levels comprises at least one of following acts:
   determining, in response to detecting a wake-up signal in each of a second preset number of monitoring periods before a current moment, the full monitoring mode as the second monitoring mode; or
   determining, in response to detecting a third preset number of wake-up signal within a second preset duration before the current moment, the full monitoring mode as the second monitoring mode.

5. The method according to claim 1, wherein the first monitoring mode is the wake-up signal monitoring mode, and switching, in response to determining that the monitoring situation satisfies the preset condition, the monitoring mode from the first monitoring mode to the second monitoring mode matching the preset condition according to the monitoring levels comprises at least one of following acts:
   determining, in response to detecting no wake-up signal for a fourth preset number of monitoring periods before a current moment, the sleep signal monitoring mode as the second monitoring mode;
   determining, in response to detecting no wake-up signal within a third preset duration before the current moment, the sleep signal monitoring mode as the second monitoring mode; or
   determining, in response to detecting less than a fifth preset number of wake-up signal within a fourth preset duration before the current moment, the sleep signal monitoring mode as the second monitoring mode.

6. The method according to claim 1, wherein the first monitoring mode is the sleep signal monitoring mode, and switching, in response to determining that the monitoring situation satisfies the preset condition, the monitoring mode from the first monitoring mode to the second monitoring mode matching the preset condition according to the monitoring levels comprises:

determining, in response to determining that a duration of a sleep state in the sleep signal monitoring mode reaches a fifth preset duration, the full monitoring mode or the wake-up signal monitoring mode as the second monitoring mode.

7. The method according to claim 1, wherein the first monitoring mode is the sleep signal monitoring mode, and switching, in response to determining that the monitoring situation satisfies the preset condition, the monitoring mode from the first monitoring mode to the second monitoring mode matching the preset condition according to the monitoring levels comprises:

determining, in response to determining that a duration of a sleep state in the sleep signal monitoring mode reaches a sixth preset duration, the wake-up signal monitoring mode as the second monitoring mode, and switching the sleep signal monitoring mode to the wake-up signal monitoring mode; and the method further comprises: switching, in response to detecting no target instruction within a seventh preset duration before a current moment, the monitoring mode from the wake-up signal monitoring mode to the sleep signal monitoring mode, monitoring the downlink channel with the sleep signal monitoring mode, and increasing the sixth preset duration.

8. The method according to claim 1, wherein a monitoring level of the full monitoring mode is higher than a monitoring level of the wake-up signal monitoring mode, and the monitoring level of the wake-up signal monitoring mode is higher than a monitoring level of the sleep signal monitoring mode; and wherein switching, in response to determining that the monitoring mode of the first downlink channel is switched to the second monitoring mode, the monitoring mode of the second downlink channel to the fourth monitoring mode according to the monitoring levels comprises:

determining, in response to determining that the monitoring level of the second monitoring mode is higher than the monitoring level of the first monitoring mode, the monitoring mode with a higher monitoring level than the third monitoring mode as the fourth monitoring mode; or determining, in response to determining that the monitoring level of the second monitoring mode is lower than the monitoring level of the first monitoring mode, the monitoring mode with a lower monitoring level than the third monitoring mode as the fourth monitoring mode.

9. A terminal, comprising:
a processor; and
a memory for storing instructions executable by the processor;
wherein the processor is configured to:
monitor a downlink channel with a first monitoring mode, the first monitoring mode comprising a full monitoring mode, a wake-up signal monitoring mode, or a sleep signal monitoring mode, monitoring levels of the full monitoring mode, the wake-up signal monitoring mode, and the sleep signal monitoring mode being different;
switch, in response to determining that a monitoring situation satisfies a preset condition, a monitoring mode from the first monitoring mode to a second monitoring mode matching the preset condition according to the monitoring levels; and
monitor the downlink channel with the second monitoring mode, the second monitoring mode being different from the first monitoring mode,
wherein the downlink channel is a first downlink channel, and the processor is further configured to:
monitor, in a process of monitoring the first downlink channel with the first monitoring mode, a second downlink channel with a third monitoring mode, a monitoring level of the third monitoring mode being not higher than a monitoring level of the first monitoring mode;
switch, in response to determining that the monitoring mode of the first downlink channel is switched to the second monitoring mode, a monitoring mode of the second downlink channel to a fourth monitoring mode according to the monitoring levels, so as to cause a monitoring level change trend of the second downlink channel to match a monitoring level change trend of the first downlink channel; and
monitor, in a process of monitoring the first downlink channel with the second monitoring mode, the second downlink channel with the fourth monitoring mode.

10. The terminal according to claim 9, wherein a monitoring level of the full monitoring mode is higher than a monitoring level of the wake-up signal monitoring mode, and the monitoring level of the wake-up signal monitoring mode is higher than a monitoring level of the sleep signal monitoring mode; and the processor is further configured to perform at least one of following acts:

determining, in response to determining that the monitoring situation satisfies a first preset condition for increasing the monitoring level, a monitoring mode with a higher monitoring level than the first monitoring mode as the second monitoring mode; or determining, in response to determining that the monitoring situation satisfies a second preset condition for decreasing the monitoring level, a monitoring mode with a lower monitoring level than the first monitoring mode as the second monitoring mode.

11. The terminal according to claim 9, wherein the first monitoring mode is the full monitoring mode, and the processor is further configured to perform at least one of following acts:

determining, in response to detecting no target instruction for a first preset number of monitoring periods before a current moment, the wake-up signal monitoring mode or the sleep signal monitoring mode as the second monitoring mode; or determining, in response to detecting no target instruction within a first preset duration before the current moment, the wake-up signal monitoring mode or the sleep signal monitoring mode as the second monitoring mode.

12. The terminal according to claim 9, wherein the first monitoring mode is the wake-up signal monitoring mode, and the processor is further configured to perform at least one of following acts:

determining, in response to detecting a wake-up signal in each of a second preset number of monitoring periods before a current moment, the full monitoring mode as the second monitoring mode; or determining, in response to detecting a third preset number of wake-up signal within a second preset duration before the current moment, the full monitoring mode as the second monitoring mode.

13. The terminal according to claim 9, wherein the first monitoring mode is the wake-up signal monitoring mode, and the processor is further configured to perform at least one of following acts:

determining, in response to detecting no wake-up signal for a fourth preset number of monitoring periods before a current moment, the sleep signal monitoring mode as the second monitoring mode;

determining, in response to detecting no wake-up signal within a third preset duration before the current moment, the sleep signal monitoring mode as the second monitoring mode; or determining, in response to detecting less than a fifth preset number of wake-up signal within a fourth preset duration before the current moment, the sleep signal monitoring mode as the second monitoring mode.

14. The terminal according to claim 9, wherein the first monitoring mode is the sleep signal monitoring mode, and the processor is further configured to:

determine, in response to determining that a duration of a sleep state in the sleep signal monitoring mode reaches a fifth preset duration, the full monitoring mode or the wake-up signal monitoring mode as the second monitoring mode.

15. The terminal according to claim 9, wherein the first monitoring mode is the sleep signal monitoring mode, and the processor is further configured to:

determine, in response to determining that a duration of a sleep state in the sleep signal monitoring mode reaches a sixth preset duration, the wake-up signal monitoring mode as the second monitoring mode, and switching the sleep signal monitoring mode to the wake-up signal monitoring mode; and switch, in response to detecting no target instruction within a seventh preset duration before a current moment, the monitoring mode from the wake-up signal monitoring mode to the sleep signal monitoring mode, monitoring the downlink channel with the sleep signal monitoring mode, and increasing the sixth preset duration.

16. The terminal according to claim 9, wherein a monitoring level of the full monitoring mode is higher than a monitoring level of the wake-up signal monitoring mode, and the monitoring level of the wake-up signal monitoring mode is higher than a monitoring level of the sleep signal monitoring mode; and the processor is configured to perform at least one of following acts:

determining, in response to determining that the monitoring level of the second monitoring mode is higher than the monitoring level of the first monitoring mode, the monitoring mode with a higher monitoring level than the third monitoring mode as the fourth monitoring mode; or determining, in response to determining that the monitoring level of the second monitoring mode is lower than the monitoring level of the first monitoring mode, the monitoring mode with a lower monitoring level than the third monitoring mode as the fourth monitoring mode.

17. A non-transitory computer-readable storage medium, wherein at least one instruction is stored in the computer-readable storage medium, and the at least one instruction is executed by a processor to implement operations comprising:

monitoring a downlink channel with a first monitoring mode, the first monitoring mode comprising a full monitoring mode, a wake-up signal monitoring mode, or a sleep signal monitoring mode, monitoring levels of the full monitoring mode, the wake-up signal monitoring mode, and the sleep signal monitoring mode being different;

switching, in response to determining that a monitoring situation satisfies a preset condition, a monitoring mode from the first monitoring mode to a second monitoring mode matching the preset condition according to the monitoring levels; and monitoring the downlink channel with the second monitoring mode, the second monitoring mode being different from the first monitoring mode, wherein the downlink channel is a first downlink channel, and the operations further comprises:

monitoring, in a process of monitoring the first downlink channel with the first monitoring mode, a second downlink channel with a third monitoring mode, a monitoring level of the third monitoring mode being not higher than a monitoring level of the first monitoring mode:

switching, in response to determining that the monitoring mode of the first downlink channel is switched to the second monitoring mode, a monitoring mode of the second downlink channel to a fourth monitoring mode according to the monitoring levels, so as to cause a monitoring level change trend of the second downlink channel to match a monitoring level change trend of the first downlink channel; and monitoring, in a process of monitoring the first downlink channel with the second monitoring mode, the second downlink channel with the fourth monitoring mode.

\* \* \* \* \*